United States Patent Office 3,494,106
Patented Feb. 10, 1970

3,494,106
METHOD FOR THE CONTINUOUS RECOVERY OF TRIOXANE
Per G. M. Flodin and Kurt S. Herz, Perstorp, Sweden, assignors to Perstorp AB, Perstorp, Sweden
No Drawing. Continuation-in-part of application Ser. No. 581,772, Sept. 26, 1966. This application June 17, 1968, Ser. No. 737,331
Claims priority, application Sweden, Oct. 6, 1965, 12,925/65
Int. Cl. B01d 53/02
U.S. Cl. 55—93                                            1 Claim

ABSTRACT OF THE DISCLOSURE

Trioxane is separated from formaldehyde in a continuous operation wherein the gaseous mixture is extracted in counter-current flow with a polyhydric alcohol such as glycerine, diethylene glycol, trimethylolpropane or trimethylolpropane-semiformal, which selectively dissolves the formaldehyde while leaving substantially all of the trioxane in the effluent gas stream. Inert gases, such as nitrogen, do not interfere with the separation.

This application is a continuation-in-part of our application Ser. No. 581,772 filed Sept. 26, 1966, and now abandoned.

BRIEF SUMMARY OF THE INVENTION

The present invention relates to a method for continuously separating trioxane in a gaseous reaction mixture from other reaction gases, particularly unreacted formaldehyde.

Trioxane is a cyclic trimer of formaldehyde and is predominantly used for the production of polyoxymethylenes. It can be manufactured in different ways, usually by distillation from a formalin solution mixed with a catalyst, but it can also be produced by trimerizing gaseous, monomeric formaldehyde. This gaseous formaldehyde is usually diluted with some inert gas, such as nitrogen, which serves to reduce the tendency of the formaldehyde to precipitate as paraformaldehyde. If the trioxane is collected without separation of the formaldehyde there are subsequent problems due to the precipitation of paraformaldehyde on vessel walls and the like.

The present invention relates to a process for the continous separation of trioxane from unreacted formaldehyde monomer and possibly other compounds after the reaction. The separated gaseous trioxane can then be used directly for polymerization. It can be sublimed, absorbed in some suitable liquid or collected in some other way. The method according to the invention is characterized in bringing a mixture of gaseous trioxane and formaldehyde, possibly together with or without one or more dilution gases into contact with an alcohol or an alcohol mixture so that the formaldehyde is absorbed in the alcohol component forming a semiformal while the trioxane substantially remains in the gaseous state. The method is preferably carried out with gas and alcohol in counter-current flow.

DETAILED DESCRIPTION OF THE INVENTION

By the process according to the invention the trioxane can be recovered or treated further without any interference from the formaldehyde. The alcohols which may be used in the process are principally glycerine, higher polyglycols, diethylene and triethylene glycols, dipropylene glycol, triethanolamine, 1,2,3-butanetriol, 1,2,4-butanetriol, 1,2,3-pentanetriol, 1,2,4-pentanetriol, 2,3,4-pentanetriol, 1,2,5-hexanetriol, 2,2-dimethyl-1,3-propanediol, trimethylolpropane, trimethylolethane, erythritol, ramnitol, sorbitol, mannitol and pentaerythritol, but other alcohols can also be used. The above-mentioned alcohols have high boiling points and are usually somewhat viscous. Therefore, if special measures are not taken, the gas will have limited contact with the alcohol and consequently the absorption will be incomplete. It is therefore advantageous to keep the alcohol at an elevated temperature while agitating vigorously. If, however, a low operating temperature is desired, the alcohol can be admixed with a substance lowering the viscosity. An efficient substance for this purpose is water.

In systems wherein the gas stream is treated successively in a plurality of absorption units different absorption solutions may be used in the different units. Thus, for some situations it may be desirable to use a mixture of alcohol, alcohol-semiformal and water in a first absorption unit, and water alone as an absorption medium in the following absorption units.

Since some of the trioxane is also dissolved in the alcohol along with the formaldehyde, the treating conditions should be adjusted so that as little as possible of the trioxane and as much as possible of the formaldehyde is absorbed.

A suitable method for obtaining this result is to have the gas-mixture flow in counter-current to the absorption medium and through different absorption units which, for example, may consist of one jacketed bubble cap column and two jacketed packed columns. The gas-mixture is first passed through the bubble cap column counter-current to liquid extractant for the formaldehyde and then through the packed columns. The packed columns are suitably disposed above each other and thus operate in series. However, they can be disposed in another way, for example, in side-by-side relation, but with series flow therethrough. The absorption medium in the packed columns consists of water which is supplied to the top of the uppermost column, if vertically disposed, and to the second or last column in the alternate arrangement. In either case the water from the second column is passed through the lowest or first packed column. The water solution so obtained, containing formaldehyde, and a small amount of trioxane is withdrawn from the bottom of the first packed column, from which it is passed into the uppermost part of the bubble cap column together with a solvent of alcohol-semiformal and alcohol. Most of the formaldehyde in the charged gas-mixture is absorbed as semiformal in the bubble cap column. The remaining gaseous formaldehyde is absorbed in the water passing through the packed columns. Most of the trioxane remains in the gas mixture withdrawn from the last packed column.

A suitable temperature in the bubble cap column is 90–150° C., in the first packed column 40–80° C. and in the last packed column 20–50° C.

When a mixture of trimethylolpropane-semiformal and trimethylolpropane is used as an absorption medium in the bubble cap column together with the water solution, it is preferable to have a temperature of about 100° C. in said column, about 60° C. in the first packed column, and about 40° C. in the last packed column. The quantity of trioxane being left in the warmest unit, the bubble cap column, amounts to about 1 percent by weight of trioxane calculated on the semiformal used. The formaldehyde gas can be absorbed almost completely.

It is convenient to feed the gas-mixture into the bubble cap column at a positive pressure of abs. 1.1–1.4 atm.

Of course it is possible to combine other kinds of columns or a different number of bubble cap columns and packed columns working within the temperature limits mentioned above.

It is also possible to carry out the absorption in a jacketed bubble cap column without any packed columns.

Then the gas mixture is preferably fed at atmospheric pressure in counter-current to the absorption medium at a temperature of up to 150° C. and consisting of a water-free alcohol-semiformal or a water-free mixture of an alcohol and an alcohol-semiformal. If the alcohol consists of trimethylolpropane the temperature in the bubble cap column should be about 85–110° C., preferably 90–100° C.

Another way to carry out the absorption is to pass the gas stream into an absorption vessel under the liquid level when stirring the absorption solution vigorously. Atmospheric pressure and a temperature of up to 150° C. is preferably used in the vessel. The absorption solution usually consists of water-free alcohol-semiformal. When trimethylolpropane-semiformal is used, the temperature is suitably 85–110° C., preferably 90–100° C.

It is also possible to pass the gas through two or more such absorption vessels connected in series while flowing the absorption solutions through these vessels in the opposite direction. Such an arrangement is advantageous in that the height of the equipment is less and they are more readily changed and controlled.

The absorption can also be carried out in an absorption column having a vertical shaft passing through the column, and for example having 30 strainers. The shaft is provided with means for stirring on the bottoms. The column is provided with a jacket, for instance divided in six sections. The column works at a slightly superatmospheric pressure, preferably between 1.1–1.6 atm. The temperature in the column may be as much as 150° C. The gas mixture is admitted to the bottom of the column and passes upwardly counter-current to a down-flowing absorption solution consisting of a water-free alcohol-semiformal or a water-free mixture of an alcohol and an alcohol-semiformal. If the absorption solutions consist of trimethylolpropane-semiformal a suitable temperature is about 90–100° C. at the lowest bottom of the column and about 60–80° C. at the uppermost bottom.

The composition of the gas being treated in the different absorption units described can vary within very wide limits, but ordinarily the composition is about 5–10 percent trioxane, 30–40 percent formaldehyde and 50–60 percent nitrogen.

The invention is further disclosed in the following examples, which are illustrative but not limitative thereof.

Example 1

From the conversion of formaldehyde to trioxane, the effluent gas-mixture had the following composition: 37 percent by volume of formaldehyde, 7 percent by volume of trioxane and 56 percent by volume of nitrogen. The mixture at a temperature of 100° C. was fed at atmospheric pressure into an absorption vessel which was provided with a stirrer, and containing 500 g. water-free trimethylolpropane-semiformal having a proportion of formaldehyde of 50%. The gas-mixture was fed at a rate corresponding to a supply of 68 g. formaldehyde per hour. The rate of stirring was 700 revolutions per minute. 32.6% of the formaldehyde was absorbed. With regard to the formaldehyde vapor pressure of the trimethylolpropane-semiformal, this means an efficiency of about 100%.

Example 2

The crude trioxane-containing effluent of Example 1 was extracted in the same manner except that the temperature in the absorption vessel was 70° C. instead of 100° C. and the formaldehyde concentration in the water-free trimethylolpropane-semiformal was 14%. In this example the amount of the semiformal was 730 g., and the amount of gas treated corresponded to 98 g. formaldehyde per hour.

In this demonstration 90% of the amount of formaldehyde in the gas was absorbed in the semiformal, corresponding to an efficiency of 87%.

Example 3

The same gas-mixture as in Example 1 and at a temperature of 100° C. was fed at atmospheric pressure and at a rate of 132 g. formaldehyde, 61 g. trioxane and 143 liters nitrogen gas per hour into the lower part of a jacketed bubble cap column having 10 bottoms and a diameter of 50 mm. the jacket temperature was 92° C. 104 g. water-free trimethylolpropane-semiformal per hour having a temperature of 70° C. and a formaldehyde concentration of 22.4 percent by weight was charged continuously in the upper part of the column. At the bottom of the column a concentrated water-free semiformal mixture containing 50.1 percent by weight of formaldehyde was obtained. The bottom temperature in the column was 93.5° C.

36% of the formaldehyde in the gas-mixture and 5% of the trioxane quantity were absorbed in this operation.

Example 4

510 liters per hour of a gas-mixture containing 60.0 percent by volume of nitrogen, 35.0 percent by volume of formaldehyde and 5.0 percent by volume of trioxane, was conducted at a temperature of 100° C. and at a pressure of 1.2 atm. from the reactor to an absorption device. This device consisted of a bubble cap column and two jacketed packed columns connected in series. The packed columns were placed above each other. The bubble cap column was the same as in Example 3.

300 g. per hour of a water-free mixture of trimethylolpropane-semiformal and trimethylolpropane having a proportion of formaldehyde of 15.2% was fed at a temperature of 70° C. into the upper part of the bubble cap column, where also 450 g. per hour of a water-solution having a temperature of 60° C. and containing 49% of formaldehyde, 46% of water and 5% of trioxane was fed, said water solution being withdrawn from the lowermost of the two superimposed series-connected packed columns. The uppermost of the packed columns was charged at its top with water at a temperature of 40° C., while the gas coming from the bubble cap column was conducted into the lower part of the bottom packed column. The temperature was 100° C. in the bubble cap column, 60° C. in the first packed column and 40° C. in the second one. 340 liters per hour of gas having a composition of 90.5 percent by volume of nitrogen, 7.5 percent by volume of trioxane, 2.2 percent by volume of water and 0.2 percent by volume of formaldehyde was taken from the second packed column at a temperature of 40° C. from the lower part of the bubble cap column, 510 g. solution per hour was withdrawn having a temperature of about 100° C. and containing 49.8% of formaldehyde, 1.2% of trioxane, 0.03% of water and the remainder trimethylolpropane.

Example 5

A gas mixture of 1200 g. formaldehyde, 360 g. trioxane and 1200 liters nitrogen was fed per hour at a temperature of 100° C. into the lower part of an absorption column, having 30 strainers, a jacket divided in six sections and provided with a vertical rotatable shaft passing through the column and having means for stirring on the bottoms. 1640 g. water-free trimethylolpropane-semiformal consisting of 15% by weight of formaldehyde and 85% by weight of trimethylolpropane was fed per hour at a temperature of 70° C. into the upper part of the column. At the bottom of the column, 2830 g. of a concentrated water-free semiformal mixture containing 49.2% by weight of formaldehyde, 49.2% by weight of trimethylolpropane and 1.6% by weight of trioxane was withdrawn per hour. At the top of the column a gas-mixture containing 35 g. formaldehyde, 310 g. trioxane and 1200 liters nitrogen per hour was withdrawn. The temperature on the lowest bottom in the column was kept at 100° C. and the pressure at 1.34 atm. The corresponding values for the temperature and the pressure on the uppermost bottom were 70° C. and 1.13 atm.

It should be understood, of course, that the foregoing disclosure relates only to preferred embodiments of the invention and that it is intended to cover all changes and modifications of the examples of the invention herein chosen for purposes of the disclosure, which do not constitute departures from the spirit and scope of the invention.

What is claimed is:

1. A continuous process for separtaing trioxane from a gaseous mixture containing a minor proportion of trioxane and a major proportion of formaldehyde which comprises, passing said mixture through a first extraction zone in counter-current contact with a mixture of trimethylolpropane and trimethylolpropane-semiformal, thereby extracting predominantly formaldehyde from said mixture, contacting the trioxane-enriched gaseous effluent from the first extraction zone in a second extraction zone with water, passing the aqueous extract from said second zone to the first extraction zone to contact the gas stream flowing therethrough, and withdrawing the trioxane from the second extraction zone.

References Cited

UNITED STATES PATENTS 2,699,225  1/1955  Dahlbeck.
3,289,391  12/1966  De Rooij et al.

REUBEN FRIEDMAN, Primary Examiner

C. N. HART, Assistant Examiner